United States Patent Office 3,623,868
Patented Nov. 30, 1971

3,623,868
GELABLE PHOTOPROCESSING SOLUTIONS
Alvin Cronig, Shaker Heights, Ohio, assignor to
Itek Corporation, Lexington, Mass.
No Drawing. Continuation-in-part of application Ser. No. 757,114, Sept. 3, 1968. This application Dec. 17, 1969, Ser. No. 886,002
Int. Cl. G03c 5/24, 5/38
U.S. Cl. 96—48
13 Claims

ABSTRACT OF THE DISCLOSURE

Gelable photoprocessing solutions are disclosed which comprise a photoprocessing solution and an amount of a heat-reversible gel forming mixture of xanthan gum and locust bean gum sufficient to cause gelation of the solution. These solutions are easily gelled, in which state they are useful for developing, fixing, washing, etc. exposed photographic films.

CROSS REFERENCE TO RELATED APPLICATION

This application is a continuation-in-part of U.S. patent application Cronig, Ser. No. 757,114, which was filed on Sept. 3, 1968, now abandoned.

BACKGROUND OF THE INVENTION (1) Field of the invention

This invention relates to photographic processing systems and more particularly to gelable and gelled photoprocessing solutions.

(2) Prior art

The need for simplified photographic processing systems has become of great interest. The conventional wet processing including developing, rinsing, fixing, washing, and drying has proven to be cumbersome in many applications. Additionally, it is often important to view results quickly, and if possible, to process without the need for involved complicated processing techniques and bulky, expensive equipment. For example, the field of aerial photography demands shorter and shorter access, or dry to dry time, with less complex hardware and simpler processing systems.

Because of the many problems encountered in processing photographic film with liquids, many attempts have been made to devise improved photoprocessing systems. Some of these include, for example: viscous processing systems (see Levy, U.S. Pat. 3,238,043); webs containing hydrophilic processing surfaces (see Tregillus et al., U.S. Pat. 3,179,517); semi-dry, gel-like systems (see Narodny, U.S. Pat. 3,282,695); homogeneous solid systems formed from polyglycol carriers (see Henn et al., U.S. Pat. 3,347,675); etc. While much research effort has been expended in trying to perfect these systems, none of these systems has proved to be very successful to date.

The desirability of formulating gelable and gelled photo processing solutions has long been recognized. Gelled solutions have the properties of solids and have the advantage of allowing relatively dry processing of film.

Some gelled photoprocessing solutions have been described in the patent literature. In Henn. U.S. Pat. 2,784,086, silver halide developer solutions are disclosed which can be gelled using up to 10% alginic acid or one of its salt or ester derivatives. Canadian Pat. No. 766,182, issued Aug. 29, 1967 teaches that certain viscous photoprocessing solutions which contain up to 5% gum mucilage can be "set" or gelled upon photographic film by contacting the viscous solution with borate ion. Illustrative of gum mucilages described are guar gum, locust bean gum, cherry gum, slippery elm gum, alginates, linseed gum, flaxseed gum, gum arabic, etc. Apparatus for processing film with gelled solutions is taught in Ross, U.S. Pat. 3,090,290 and in Baumbach, U.S. Pat. 3,190,205.

Gelled photoprocessing solutions heretofore, available, however, have had many problems and disadvantages. One major problem has been the difficulty in obtaining good surface uniformity, which is necessary to avoid mottling and/or non-uniformities on the processed film.

Other major disadvantages or problems encountered with prior gelled processing systems are the difficulties in obtaining: sufficient rigidity or break strength combined with good elasticity; resistance to syneresis (weeping); low tackiness or non-adhesiveness.

Additionally, some of the gelled compositions of the prior art are not heat-reversible. Heat-reversibility is desirable to permit repeated extrusion and recycling of the photoprocessing solutions. Heat-reversible gelled solutions can also be stored and shipped as solids and thereafter heated to their melting temperature and applied in the desired shaped or configuration for processing.

SUMMARY OF THE INVENTION

The invention comprises gelable photoprocessing solutions which contain an amount of gel former sufficient to gel the solution. The gel former is made up of about 10% to 99% xanthan gum and also about 1% to 90% locust bean gum. Gellation is usually accomplished by heating the gelable solutions to a temperature above the gel critical temperature and subsequently cooling the solution to cause gelation thereof.

One method for processing photosensitive media with the gelable photoprocessing solutions of this invention is as follows. The gelable solution is applied to a photosensitive medium at an elevated temperature and subsequently allowed to cool whereupon gelation occurs. The gelled solution is allowed to remain upon the medium until processing is complete, after which the gelled solution is stripped from the medium.

CHARACTERISTICS OF THE INVENTION

Photoprocessing solutions gelled with a mixture of xanthan gum and locust bean gum have may advantages over gelled photoprocessing solutions heretofore known. For example, the gelled solutions of this invention are thermally reversible. These solutions can be changed from the gelled state to the solution state by moderate heating and the process can be reversed with moderate cooling. In the transition, these compositions go through a sol state.

Furthermore, both the critical temperature to which a solution must be heated to make it capable of forming a gelled solution on cooling, and the temperature at which the solution sets and at which it is thermally reversible are within the useful range for photoprocessing. Generally, gel critical temperatures for mixtures of xanthan gum and locust bean gum in gelable photoprocessing solutions are in the range of from about 160° F. to 180° F. and the setting temperatures are in the range of about 120° F. to 140° F. As is apparent, these temperature ranges are excellent for photoprocessing, particularly for rapid processing. That is a vast improvement over heretofore known gelable photoprocessing solutions which gelled at much lower temperatures, sometimes only slightly above their freezing points. The gelable solutions of this invention also set sharply at their setting temperatures which adds another advantage to their use of photoprocessing.

Additionally, the present gelled solutions are especially suited for photoprocessing since their surfaces are smooth and they exhibit low syneresis.

On contact with a film surface, the processing reagent is transferred by diffusion. Additionally, diffusion is twoway since processing reagents diffuse into the photosensitive medium while spent chemicals simultaneously diffuse out of the photosensitive medium and into the gelled solution.

Also, the gelable compositions of the present invention are capable of forming easily strippable surfaces at or below their setting temperatures. An easily strippable surface is one which exhibits low adhesion to the photosensitive medium and which forms a layer having good internal cohesion and therefore can be readily peeled from the photosensitive medium without damage to the emulsion. This feature combined with the heat-reversibility of the gelled solutions allows recycling of the photoprocessing solutions until the processing chemistries are spent.

Considerable further advantages are realized with the present gelable and gelled solutions in that the physical characteristics and properties thereof can be altered with considerable ease by varying the proportions of xanthan gum and locust bean gum used, and/or mixing the combination gel former with other gel formers.

Gel formers consisting of xanthan gum and locust bean gum do not appear to be sensitive to cations such as ammonium, calcium or potassium, which are often found in photoprocessing solutions.

A distinct advantage of the present gel formers is their high order of compatibility with photoprocessing solutions, particularly those containing high concentrations of solutes, especially inorganic salts, such as fixing solutions containing alkaline metal thiosulfates and/or thiocyanates. Photoprocessing solutions have a wide range of pH values, and a further advantage of this invention is that gelled solutions can be formed over an extremely wide pH range.

The present new gelled compositions also have a wide stability even when used in the form of very thin films.

Another unique advantage of the photoprocessing solutions gelled with a combination of xanthan gum and locust bean gum is the excellent surface elasticities obtained while still retaining good break strengths. This makes such the gelled solutions especially useful in the form of pads for photoprocessing.

It is important to recognize that the gelled solutions of the present invention are significantly different from photoprocessing solutions of the prior art variously categorized as viscous, jelly-like, rubbery, pastes, gel-like, etc. The new gel solutions are true gels which have a rigidity common to solids.

Viscosity is a meaningless term in describing these gelled solutions because the three-dimensional network of the gel former is broken down in attempts to measure viscosity. One method of characterizing these gelled solutions is in terms of their break strengths and elasticities. Break strength is measured with a gelometer and is expressed in terms of the grams of force required to break through the surface of a unit area of the gelled solutions. Elasticity is the ability of the gelled solution to recover its original shape after deformation in a short time cycle and is customarily expressed as a percentage of the elongation in a plane parallel to the plane of a particular layer.

DESCRIPTION OF THE PREFERRED EMBODIMENTS

For purposes of this invention:
(1) The term "photoprocessing solution" is used to mean any solution or dispersion used to process photosensitive media, before or after exposure, such as chemical or physical developers, fixers, stabilizers, washes, stop baths, etc.;
(2) The term "gelable solution" is used to mean a solution which can be gelled by any treatment including but not limited to: (1) heating followed by cooling; (2) contacting with certain cations and/or anions; (3) changing the pH; and (4) combination of these techniques;
(3) The term "gelled solution" is used to mean a solution in which the gel former has formed a structural network which contains the liquid components of the solution in a rigid but elastic form.

The heat-reversible gel formers of this invention consist of a mixture of xanthan gum and locust bean gum. To form gelled solutions sufficiently rigid for photoprocessing, it has been found that at least about 10% xanthan gum is required and that at least about 1% locust bean gum is required. Therefore, the gel formers of this invention contain from about 10% to about 99% xanthan gum and from about 1% to about 90% locust bean gum, the sum of the two components being equal to 100%.

Xanthan gum is a high molecular weight polysacharide derived from *Xanthamonas campestris*. It contains D-glucose, D-mannose, and D-glucuronic acid as the dominant hexose units. For a more detailed discussion of the composition and physical and chemical properties of xanthan gum, see the following publications: Federal Register, vol 34, No. 53, Mar. 19, 1969, subchapter B, part 121, subpart D; Keltrol, Technical Bulletin DB No. 18, Kelco Company, Clark, N.J.

Locust bean gum is a high molecular weight polysaccharide derived from *Ceratonia siliqua*. It contains a high proportion of D-galacto-D-mannoglycan in its structure along with smaller amounts of pentoglycan, protein, cellulose and ash. A detailed description of the composition and physical and chemical properties of locust bean gum is presented in Whistler and BeMiller, Industrial Gums (Polysaccharides and Their Derivatives), Academic Press, New York (1959) at pages 361–376.

As stated above, xanthan gum and locust bean gum are presently derived from natural sources. To the extent, however, that these products can be prepared in the laboratory by synthesis, the synthetic products should give the same overall results and the invention is intended to embrace such synthetic polysaccharides.

Xanthan gum, locust bean gum, and combinations of these are readily available in commercial quantities under a variety of commercial names. The properties of the commercial products will vary with the particular source and/or the manner of commercial extraction. Some examples of commercial products are as follows:

| Gum | Trademark or trade name | Source |
| --- | --- | --- |
| Xanthan gum | Keltrol® | Kelco Co., Clark, N.J. |
| Locust bean gum | Clarified locust bean gum. | Marine Colloids, Springfield, N.J. |
| 50% xanthan gum, 50% locust bean gum. | Kelgum | Kelco Co., Clark, N.J. |

The gelable solutions of this invention contain an amount of gel former sufficient to cause gelation of photoprocessing solutions. Usually, it is desirable to have as low a ratio of gel former weight to solution weight as is possible. Preferably, the gel former will comprise less than about 5% and more preferably less than about 2% by weight of the total photoprocessing solution. Normally, at least 1% gel former is required to obtain a gelled photoprocessing solution having good gel characteristics.

A very low amount of the liquid photoprocessing reagent is used by the gel former in gelation. The remainder is available for use in photoprocessing.

Gelled photoprocessing compositions can be conveniently formed by heating a mixture of the heat-reversible carriageenan or furcellaran gel former with the processing solution at or above a gel critical temperature followed by cooling below the setting temperature. The heat-reversible gel formers apparently will not form the three dimensional network unless they are heated to a gel critical temperature which depends on the particular gel former. Of course, the photoprocessing solution can be heated to the gel critical temperature and the gel former added, or the two can be mixed at a lower temperature and subsequently heated together to the gel critical temperature. The desired photoprocessing material can be present in the solution before the heating process, or added during or after the heating step. Also, the set gelled solution may comprise only the solvent and gel former, in which case the photoprocessing material can be added to the gelled solvent by imbibing a solution thereof, e.g. by immersing the gelled solvent in a suitable solution, or alternatively, by merely liquefying the gelled solvent and adding the photoprocessing material to the liquid and subsequently resetting the solution by cooling.

The temperature of heating in formulating the gelled solution should be sufficient to effect solution of the gel former in the selected solvent and, further, sufficient to provide the critical temperature required for the particular gel former selected. The gel critical temperature is the temperature at which the gel former effects the change required to obtain the gelled structure upon cooling below the setting temperature, i.e. the formation of the network required for gelation to occur. The critical temperature is usually above the setting temperature of the gel for which reason the determination of the critical temperature for any given composition can be easily accomplished by removing small samples from the heated mixture and cooling the sample. The critical temperature thus is readily determinable by simple experimentation. Usually prolonged heating is preferably avoided to minimize loss of the solvent, most commonly water, in view of which it is preferred to limit the heating temperature to just at or slightly above the critical temperature.

The gelled photoprocessing solutions of this invention customarily have break strengths of from about 10 to about 400 grams and preferably from about 50 to about 150 grams measured with a gelometer having a quarter inch diameter plunger. The elasticities, measured as a percentage of the elongation that a gelled solution can undergo before it exceeds its elastic limit are usually in the range of from about 1% to about 50%, and preferably from about 20% to about 40%.

The solvent for the gel formers of this invention is commonly water but can include other solvents, especially those commonly used in photoprocessing, such as the lower alkanols e.g. methanol, ethanol and propanol, which can be mixed with water to form a suitable solvent system. For best results, the gel former is usually admixed with a small volume of the solvent to form a paste which is then added to the main volume of the solvent maintained at the selected temperature.

The pH of the photoprocessing solutions to be gelled is not critical. It has been found that excellent gelled photoprocessing solutions can be formed with solutions having a wide range of pH values. For the best results, it is preferred to have a pH in the photoprocessing solution between about 2.5 and about 12.

In the photoprocessing of exposed photographic media, the present new compositions can be utilized in either the gelable or gelled state. Conveniently, the solutions can be brought directly into contact with the photographic medium in the set state or can be applied in the liquid or sol state preferably at a viscosity between about 500–2000 centipoise at 135–160° F. For convenience, the gelable compositions can be produced in liquid form by heating the gel former and the selected solvent containing the photoprocessing material by the method described hereinbefore and, before setting, the liquid mixture can be applied to the photographic medium. After application, the solution is cooled by the ambient air or with cooling apparatus causing the solution to become gelled, or set by other techniques, which means that the used gelled solution can be removed from the processed medium by simple stripping.

Gelled photoprocessing solutions can also be applied to photosensitive media by using gel rollers, gel tapes or gel pads.

The gelable solutions can be utilized in a multilayered arrangement on the photosensitive medium to provide different photoprocessing materials in each layer.

As noted above, physical developers and other solutions useful in processing physically developable media can be gelled with carrageenans or furcellarans. Physical developers according to this invention are intended to include those image-forming systems such as described in U.S. Pat. 3,152,903, in British patent specification No. 1,043,250 and British Pat. 1,064,725. These image-forming materials include preferably an oxidizing agent and a reducing agent. Such image-forming materials are also often referred to in the art as electroless plating paths. Electrolytic development such as taught in U.S. Pat. 3,152,969 can also be used. The oxidizing agent is generally the image-forming component of the image-forming material. Either organic or inorganic oxidizing agents may be employed as the oxidizing component of the image-forming material. The oxidizing and reducing agent may be combined in a single processing solution or may also be in separate solutions. Preferred oxidizing agents comprise the reducible metal ions having at least the oxidizing power of cupric ion and include such metal ions as $Ag^{+2}$, $Hg^{+2}$, $Pb^{+4}$, $Au^{+1}$, $Au^{+3}$, $Pt^{+2}$, $Pt^{+4}$, $Ni^{+2}$, $Sn^{+2}$, $Pb^{+2}$, $Cu^{+1}$, and $Cu^{+2}$.

The reducing agent component of the image-forming materials of this invention are inorganic compounds such as the oxalates, formates, and ethylenediaminetetraacetate complexes of metals having variable valence; and organic compounds such as dihydroxybenzenes, aminophenols, and aminoanilines. Also, polyvinylpyrrolidone, hydrazine, and ascorbic acid may be used as reducing agents in this invention. Suitable specific reducing compounds include hydroquinone or derivatives thereof, o- and p-aminophenol, p-methylaminophenol sulfate, p-hydroxyphenyl glycine, o- and p-phenylenediamine, 1-phenyl-3-pyrazolidone, alkali and alkaline earth metal oxalates and formates.

The invention is further illustrated by the following examples. All parts and percentages are by weight unless otherwise specified.

EXAMPLE 1

Kelgum, a 1:1 mixture of xantham gum and locust bean gum produced by Kelco Company, is employed to gel an image-forming composition comprising an acid fixer solution having the following composition:

Ammonium thiosulfate (60% solution)—265.0 cc.
Sodium sulfite—15.3 g.
Acetic acid, glacial—4.0 cc.
Water, to make 1.0 liter.

The pH of this solution is 6.5. The Kelgum polysaccharide in the amount of between about 1 to 1½ weight (10–15 grams per liter) is sufficient for use with a fixer solution to form a gel. The fixer solution is first heated to a temperature of about 150–170° F. Any air contained in the fixer solution is then removed by agitation of the solution with a mixer such as an ultrasonic mixer. To a portion of the fixer solution the gel former is slowly added to pre-soak the dry powder and form a paste. Preferably the paste is allowed to sit at room temperature (70–75° F.) for at least half an hour. The agitator which preferably has blades at two levels is introduced into the solution and preferably operated away from the center to prevent the formation of a vortex and the resultant introduction of air to the solution. The gel former paste is then added slowly to the solution while the mixer is operated at about 50 r.p.m. over a period of about one-half to one hour. The mixer is then increased to about 3,000 to 4,500 r.p.m. for 10 to 20 minutes. The speed is then reduced to about 1,000 r.p.m. for about 15–30 minutes to permit air bubbles to be removed. When the solution is allowed to cool to a temperature of about 125–130° F. or below there is formed a gel having a high breakforce and low syneresis. The gel formed is heat-reversible with a melting or solution temperature of 145–160° F. and setting temperature of about 125–130° F. The gels produced in this manner provide a highly uniform, strippable surface.

EXAMPLE 2

An alkaline developer solution of the following composition was gelled using a wide variety of proportions of xanthan gum and locust bean gum as the gel former:

|  | G. |
|---|---|
| Anti-fog #2 (Eastman Kodak) | 0.50 |
| Sodium sulfite | 75.00 |
| Ethylenediaminetetraacetic acid (EDTA) | 2.00 |
| Phenidone A | 1.00 |
| Hydroquinone | 10.00 |
| Sodium hydroxide | 5.00 |

Water to make 1.0 liter.

For each gelled solution, a total of 3.5 grams of the gel former was used. This amounted to slightly more than 1% gel former in each of the gelled solutions.

The gel former was added to 150 mls. of the developer solution. The solution was stirred by hand or with a mechanical mixer and 150 mls. of hot water (about 120° F.) was added during heating to about 165° F. The resulting gelable solution was cooled to room temperature and the break strength and other gel characteristics were evaluated. Break strengths were measured with a gelometer having a quarter inch diameter plunger.

The results were:

| Xanthan gum (percent) | Locust bean gum (percent) | Break-strength (grams) |
|---|---|---|
| 0 | 100 | 0 |
| 1 | 99 | 0 |
| 5 | 95 | 0 |
| 7 | 93 | 0 |
| 10 | 90 | 8 |
| 25 | 75 | 12 |
| 50 | 50 | 65 |
| 60 | 40 | 75 |
| 70 | 30 | 100 |
| 75 | 25 | 98 |
| 80 | 20 | 85 |
| 90 | 10 | 50 |
| 99 | 1 | 16 |
| 99.5 | 0.5 | 0 |
| 100 | 0 | 0 |

As can be seen, gels did not form using either the xanthan gum or locust beam gum alone, but strong gels did form when the two were mixed in most proportions. Besides having the excellent break strengths set forth above, these gels also exhibited excellent elastic properties.

EXAMPLE 3

A gel pad was formed by cooling the gelable solution of Example 2 which contained 50% xanthan gum and 50% locust bean gum as the gel former in a shallow container. This pad was used to develop Eastman Kodak Fine Grain Aerial Duplicating Film, Type 2430 which was given an absolute log exposure of 1.10 using an EG&G Mark VI Sensitometer. Development was accomplished by contacting the film and gel pad at 75° F. for one minute.

A sensitometric curve was plotted for the developed film and it corresponded closely to those for liquid development of the same film under similar exposure conditions. The following values were obtained from the sensitometric curve:

| Gamma | 1.20 |
|---|---|
| $D_{max.}$ | 2.52 |
| $D_{min.}$ | 0.03 |

EXAMPLE 4

A gelable photoprocessing solution containing a low pH (pH equal to 4.55) fixer solution and a gel former comprising 50% xanthan gum and 50% locust bean gum was formed using the following procedure. 1.75 grams of xanthan gum and 1.75 grams of locust bean gum was added to 300 milliliters of Eastman Kodak Rapid Fixer solution at room temperature. The entire solution was heated to 175° F. under gentle agitation. After reaching temperature, the gelable solution was cooled to room temperature for evaluation of its properties. The gelled fixer had excellent elasticity and had a break strength of 80.

EXAMPLE 5

The procedure of Example 2 was used except that a gel former comprising 50% xanthan gum and 50% locust bean gum was used to form a gelable color developer solution of the following composition:

Quadrafos—5.00 g.
Benzyl alcohol—15.00 ml.
Tert-butylamine borane—0.28 g.
Sodium sulfite—7.50 g.
Sodium phosphate, tribasic—40.00 g.
Sodium bromide—0.90 g.
Potassium iodide (0.1% soln.)—24.0 mls.
Citrazinic acid—3.60 g.
CD-3 (Eastman Kodak)—13.00 g.
Potassium hydroxide—10.5 g.
Water to 1.0 liter
pH—12.2.

Upon heating and cooling the gelable solution as in Example 2, there was provided a gelled color developer which had excellent gel characteristics for photoprocessing and had a break strength of 382.

What is claimed is:
1. A gelable composition comprising:
    (a) an aqueous photoprocessing solution; and,
    (b) a heat-reversible gel former comprising a mixture of from about 10% to about 99% by weight xanthan gum and from about 1% to about 90% by weight locust bean gum, said gel former being present in an amount sufficient to gel said photoprocessing solution.
2. A composition of claim 1 wherein said gel former is present in an amount of less than about 5% by weight.
3. A composition of claim 2 wherein said gel former comprises a mixture of from about 50% to about 90% by weight xanthan gum and from about 10% to about 50% by weight locust bean gum.
4. A composition of claim 3 wherein said photoprocessing solution comprises a developer.
5. A composition of claim 4 wherein said photoprocessing solution comprises a chemical developer.
6. A composition of claim 4 wherein said photoprocessing solution comprises a monobath developer solution.
7. A composition of claim 4 wherein said photoprocessing solution comprises a physical developer.
8. A composition of claim 3 wherein said photoprocessing solution comprises a fixer solution, said fixer solution "being adapted" for use in a physical development system.
9. A photoprocess comprising:
    (a) heating to at least its gel critical temperature a gelable composition comprising an aqueous photoprocessing solution and an amount of a heat-reversible gel former sufficient to gel said photoprocessing solution, said gel former comprising a mixture of from about 10% to about 99% by weight xanthan gum and from about 1% to about 90% by weight locust bean gum;
    (c) contacting a photosenstive medium with said heated gelable processing composition;
    (d) cooling said processing composition to a temperature below its setting temperature to form a gelled processing composition on said photosensitive medium; and,
    (e) removing said gelled processing composition from the photosensitive medium.
10. A photoprocess of claim 9 wherein said gelled processing composition is removed from said photosensitive medium by stripping it therefrom.
11. A method of forming a heat-reversible gelled photoprocessing solution comprising:

(a) contacting said photoprocessing solution with an amount of a mixture of from about 10% to about 99% by weight xanthan gum and from about 1% to about 90% by weight locust bean gum, sufficient to gel said solution whereby a gelable solution is formed;

(b) heating the gelable solution to a temperature at least equal to the gel critical temperature of said gel former; and, (c) subsequently cooling the gelable solution to a temperature below the setting temperature of said gelable solution.

12. A method of claim 11 wherein said photoprocessing solution is contacted with a gel former comprising a mixture of from about 50% to about 90% by weight xanthan gum and from 10% to about 50% by weight locust bean gum.

13. A method of claim 12 wherein the gelable solution is heated to a temperature of at least about 160° F.

References Cited

UNITED STATES PATENTS

| | | | |
|---|---|---|---|
| 3,250,620 | 1/1962 | Lovett et al. | 96—114 |
| 3,238,043 | 3/1966 | Levy | 96—63 |

FOREIGN PATENTS

| | | | |
|---|---|---|---|
| 766,182 | 8/1970 | Canada | 96—63 |

NORMAN G. TORCHIN, Primary Examiner

R. E. FICHTER, Assistant Examiner

U.S. Cl. X.R.

96—48 PD, 61 M, 63